United States Patent [19]

Ogoshi et al.

[11] Patent Number: 5,853,598

[45] Date of Patent: Dec. 29, 1998

[54] PROCESS FOR TREATING WASTE WATER OF FLUE GAS DESULFURIZATION

[75] Inventors: Tsutomu Ogoshi; Yohka Tsurumaru; Hisao Tsuboya; Tsukasa Watanabe; Masao Enami, all of Tokyo, Japan

[73] Assignee: Kurita Water Industries Ltd., Tokyo, Japan

[21] Appl. No.: 808,397

[22] Filed: Feb. 28, 1997

[30] Foreign Application Priority Data

Mar. 8, 1996 [JP] Japan .................................... 8-080919

[51] Int. Cl.[6] ........................................................ C02F 1/58
[52] U.S. Cl. .......................... 210/724; 210/683; 210/726; 210/757
[58] Field of Search ..................... 210/666, 716, 210/717, 719, 724, 726, 683, 757

[56] References Cited

U.S. PATENT DOCUMENTS

| | | | |
|---|---|---|---|
| 2,171,203 | 8/1939 | Urbain et al. . | |
| 3,521,752 | 7/1970 | Lindman et al. . | |
| 3,522,173 | 7/1970 | Lindman et al. . | |
| 3,575,853 | 4/1971 | Gaughan et al. . | |
| 3,914,387 | 10/1975 | van Jordan et al. . | |
| 3,931,007 | 1/1976 | Sugano et al. | 210/724 |
| 3,984,312 | 10/1976 | Dulin et al. | 210/717 |
| 4,123,355 | 10/1978 | Poradek et al. . | |
| 4,154,673 | 5/1979 | Otani et al. | 210/675 |
| 4,224,148 | 9/1980 | Lindman et al. . | |
| 4,405,464 | 9/1983 | Baldwin et al. | 210/717 |
| 5,021,163 | 6/1991 | Anderson et al. | 210/661 |
| 5,202,030 | 4/1993 | Axnäs | 210/717 |
| 5,330,658 | 7/1994 | Grant et al. | 210/717 |
| 5,575,919 | 11/1996 | Santina | 210/717 |

FOREIGN PATENT DOCUMENTS

| | | |
|---|---|---|
| 2023065 | 8/1970 | France . |
| 3001929 A1 | 7/1981 | Germany . |
| 69274 | 1/1974 | Luxembourg . |
| 360574 | 11/1931 | United Kingdom . |
| 2206342 | 1/1989 | United Kingdom . |
| WO 90/13518 | 11/1990 | WIPO . |

OTHER PUBLICATIONS

Patent Abstracts of Japan, Derwent Publications, Ltd. of JP 06 079 286, Mar. 22, 1994.
Patent Abstracts of Japan, Derwent Publications, Ltd. of JP 60 197224, Oct., 1995.
Patent Abstracts of Japan, Derwent Publications, Ltd. of JP 07 075778 Mar. 20, 1995.
Patent Abstracts of Japan, Derwent Publications, Ltd. of JP 55 073392 Jun. 3, 1990.

*Primary Examiner*—Jay H. Woo
*Assistant Examiner*—Betsey J. Morrison
*Attorney, Agent, or Firm*—Frishauf, Holtz, Goodman, Langer & Chick, P.C.

[57] ABSTRACT

A process for treating waste water of flue gas desulfurization comprising successively adjusting the pH of the waste water to 5 or less, bringing the waste water into contact with a column packed with fine particles of iron, flocculating the waste water, removing formed flocs from the waste water by solid-liquid separation, and optionally, bringing the remaining waste water into contact with a resin for COD adsorption, successively. Hazardous substances, such as oxidative substances, peroxosulfuric acid, iodic acid, heavy metals such as copper and lead, and non-metallic substances such as selenium compounds and fluorites, can be removed simultaneously and efficiently from the waste water of flue gas desulfurization containing these hazardous substances by using the process which is a simplified waste water disposal system. Water having an excellent quality for a long time can be obtained by the process because deterioration of a resin for COD adsorption by oxidative substances such as peroxosulfuric acid and iodic acid can be prevented. Thus, an easy and efficient process for treating waste water of flue gas desulfurization can be provided.

18 Claims, 3 Drawing Sheets

PROCESS FOR TREATING WASTE WATER OF FLUE GAS DESULFURIZATION

FIELD OF THE INVENTION

The present invention relates to a process for treating waste water of flue gas desulfurization. More particularly, the present invention relates to a process for treating waste water of flue gas desulfurization which efficiently treats waste water containing hazardous substances, such as peroxosulfuric acid, iodic acid, heavy metals, selenium compounds, and fluorides, which is disposed from an apparatus for desulfurization of flue gas in a plant such as a thermoelectric power plant.

PRIOR ART OF THE INVENTION

In a thermoelectric power plant, waste water which is disposed from an apparatus for desulfurization of flue gas generated by combustion of coal or petroleum contains various types of hazardous substances, such as heavy metals and non-metallic substances, and these hazardous substances must be removed from the waste water of flue gas desulfurization. The quality of waste water of flue gas desulfurization is varied depending on the improvement in both the efficiency of combustion of fuel and the process for flue gas desulfurization in the thermoelectric power plant. Therefore, a process for treating waste water of flue gas desulfurization is required which can cope with the change of the quality of water.

The present inventors formerly proposed a process for removing COD components, suspended substances, and metal salts contained in waste water of flue gas desulfurization (Japanese Patent Publication Showa 55(1980)-12312). In the proposed process, suspended substances and metal salts in the waste water are removed by a treatment for flocculation by adding an inorganic flocculent, organic flocculant, or a pH modifier to the waste water, followed by removing formed flocks from the waste water by solid-liquid separation, and then COD components are removed from the treated waste water by adsorption using a synthetic adsorbing resin having a basic active group. COD components, metal salts, and fluorides in waste water of flue gas desulfurization can be removed by this process. However, when waste water of flue gas desulfurization contains oxidative substances, such as peroxosulfuric acid and iodic acid, and selenium compounds, removal of these substances are difficult. Particularly, when waste water containing oxidative substances such as peroxosulfuric acid or iodic acid is brought into contact with a resin for COD adsorption, the resin shows rapid decrease in the properties or deterioration to cause decrease in the efficiency of removing COD components.

The present inventors further proposed a process for treating waste water of flue gas desulfurization containing peroxosulfuric acid and COD components (Japanese Patent Application Laid-Open No. Heisei 7(1995)-75778). In the process, pH of waste water of flue gas desulfurization is adjusted to 5 or less, and the resulting waste water is brought into contact with active charcoal to remove peroxosulfuric acid by decomposition and subsequently with a resin for COD adsorption. In accordance with this process, the efficiency of adsorption of COD components is increased, and the deterioration of the resin for COD adsorption with time can be prevented. Therefore, treated water having a high quality can be obtained. However, consumption of the active charcoal is varied depending on the quality of waste water, and sufficient control of the process for treating waste water is necessary for stabilizing the quality of the treated water. This process has other drawbacks in that the quality of treated water is decreased when the concentration of the oxidizing substances are very high, and that removal of selenium compounds cannot be expected when selenium compounds are contained in the waste water of flue gas desulfurization.

As for the treatment of water containing selenium compounds, many modified processes comprising flocculation and precipitation have been proposed. For example, a process in which ferrous sulfate or ferrous chloride is added as an iron salt to waste water, and a neutralizing agent is then added to the resulting water to coprecipitate selenium compounds with flocks of ferrous hydroxide has been proposed (Japanese Patent Application Laid-Open No. Heisei 6(1994)-79286). However, in accordance with this process, the concentration of selenium in the finally obtained treated water is decreased only to 0.2 to 0.4 mg/liter, and the concentration of 0.1 mg/liter which is required by the regulation of waste water cannot be achieved.

SUMMARY OF THE INVENTION

Accordingly, the present invention has an object of providing an easy and efficient process for treating waster water of flue gas desulfurization which can remove hazardous substances, such as peroxides such as peroxosulfuric acid and iodic acid, heavy metals such as copper and lead, and non-metallic substances such as selenium and fluorine, simultaneously and efficiently from waste water of flue gas desulfurization containing these hazardous substances by using a simplified waste water disposal system and provides water having an excellent quality for a long time by preventing deterioration of a resin for COD adsorption by peroxides, such as peroxosulfuric acid and iodic acid.

As the result of extensive studies to achieve the above object, it was discovered that oxidative substances, heavy metals, and non-metallic substances contained in waste of flue gas desulfurization water can simultaneously be removed to low concentrations by adjusting pH of the waste water to 5 or less, bringing the treated waste water into contact with iron, treating the resultant waste water for flocculation, and removing the formed flocs from the waste water by solid-liquid separation, successively, and that the concentration of COD components in the treated waste water can be decreased for a long time with stability by bringing the above treated waste water into contact with a resin for COD adsorption. The present invention has been completed on the basis of these discoveries.

Accordingly, the present invention provides:

(1) A process for treating waste water of flue gas desulfurization comprising adjusting pH of the waste water to 5 or less, bringing the waste water into contact with iron, treating the waste water for flocculation, and removing formed flocs from the waste water by solid-liquid separation, successively;

(2) A process described in (1) wherein the waste water of flue gas desulfurization is disposed from an apparatus for desulfurization of flue gas in a thermoelectric power plant using coal or petroleum as fuel;

(3) A process described in (1) wherein the waste water of flue gas desulfurization contains oxidative substances;

(4) A process described in (1) wherein the waste water of flue gas desulfurization contains selenium compounds;

(5) A process described in (3) wherein the oxidative substance is peroxosulfuric acid or iodic acid;

(6) A process described in (1) wherein the iron has a shape of fine particles, net wires, or granules and a maximum diameter of 3 mm or less;

(7) A process described in (1) wherein pH of the waste water is adjusted to 2 to 3;

(8) A process described in (1) wherein pH of the waste water is adjusted to 5 or less by adding an acid in two or more separate steps;

(9) A process described in (1) wherein the waste water is brought into contact with iron until pH of the treated waste water reaches 5 to 7 or until oxidation-reduction potential of the treated waste water reaches −100 mV or less;

(10) A process described in (1) wherein the treatment of the waste water for flocculation is conducted by adjusting pH of the waste water to 8 or more by adding an alkali;

(11) A process for treating waste water of flue gas desulfurization comprising adjusting pH of the waste water to 5 or less, bringing the waste water into contact with iron, treating the waste water for flocculation, removing formed flocs from the waste water by solid-liquid separation, and bringing the remaining waste water into contact with a resin for COD adsorption, successively;

(12) A process described in (11) wherein the waste water of flue gas desulfurization is disposed from an apparatus for desulfurization of flue gas in a thermoelectric power plant using coal or petroleum as fuel;

(13) A process described in (11) wherein the waste water of flue gas desulfurization contains oxidative substances;

(14) A process described in (11) wherein the waste water of flue gas desulfurization contains selenium compounds;

(15) A process described in (13) wherein the oxidative substance is peroxosulfuric acid or iodic acid;

(16) A process described in (11) wherein the iron has a shape of fine particles, net wires, or granules and a maximum diameter of 3 mm or less;

(17) A process described in (11) wherein pH of the waste water is adjusted to 2 to 3;

(18) A process described in (11) wherein pH of the waste water is adjusted to 5 or less by adding an acid in two or more separate steps;

(19) A process described in (11) wherein the waste water is brought into contact with iron until pH of the treated waste water reaches 5 to 7 or until oxidation-reduction potential of the treated waste water reaches −100 mV or less; and (20) A process described in (11) wherein the resin for COD adsorption is an anion exchange resin.

BRIEF DESCRIPTION OF THE DRAWINGS

The numbers in the figures have the meanings as listed in the following.

1: a tank for pH adjustment
2: a reactor
3: a tank for separation of precipitates
4: a tank for pH adjustment
5: a pump
6: a column packed with fine particles of iron
7: a reactor
8: a tank for separation of precipitates
9: a tank for pH adjustment
10: a pump
11: a column pack with fine particles of iron
12: a reactor
13: a tank for separation of precipitates
14: a pump
15: a column packed with a resin for COD adsorption

DETAILED DESCRIPTION OF THE INVENTION

The process of the present invention can be applied to treatment of waste water of flue gas desulfurization which contains hazardous substances, such as oxidative substances, peroxosulfuric acid, iodic acid, heavy metals such as copper, lead, and zinc, and non-metallic substances such as selenium compounds and fluorides, other suspended substances, COD components, and nitrogen components.

In the process of the present invention, pH of waste water of flue gas desulfurization is adjusted to 5 or less, preferably 2 to 3, by adding a pH modifier. The pH modifier is not particularly limited, and hydrochloric acid or sulfuric acid is advantageously used. When pH of the water for treatment is more than 5, dissolution of iron into the water for treatment takes time, or there is the possibility that iron is not sufficiently dissolved into the water for treatment, when the water is brought into contact with iron. When pH of the waste water of flue gas desulfurization is less than 5, it is not always necessary that the adjustment of pH be conducted. It is preferred that pH of the water to be treated is 2 to 3 because iron is dissolved fast and contributes to the reaction. When pH of the water to be treated is 1 or less, the dissolution of iron is excessively fast, and there is the possibility that an excessive amount of iron is dissolved. In the present invention, the adjustment of pH can be conducted at any desired place. For example, pH can be adjusted in a tank for pH adjustment which is placed before a reactor. Alternatively, pH can be adjusted by adding a pH modifier into a reactor or by supplying a pH modifier directly into the piping of the water to be treated.

When an acid, such as hydrochloric acid or sulfuric acid, is injected into the water to be treated to adjust pH of the water, it is preferred that pH of the water is adjusted first to a value in the range of 4 to less than 5 by adding the acid to remove alkaline components and then adjusted to the specified value by adding the acid further to the obtained water to be treated because the adjustment of pH is facilitated and excessive dissolution of iron can be suppressed.

In the process of the present invention, as the iron which is brought into contact with the water to be treated which has been adjusted to a pH of 5 or less, pure iron, crude steel, an alloy steel, or another iron alloy can be used. The iron preferably has a shape having a large surface area, such as fine particles, net wires, and granules. The iron preferably has a shape having a maximum diameter of 3 mm or less, more preferably 1 mm or less.

In the process of the present invention, the method of bringing the water to be treated which has been adjusted to a pH of 5 or less into contact with iron is not particularly limited. For example, the water for treatment can be brought into contact with iron by passing the water through a column packed with fine particles of iron, net wires of iron, or granules of iron; or by adding fine particles of iron, net wires of iron, or granules of iron to the water to be treated in a reactor. It is preferred that the time of the contact between the water for treatment and iron is generally 2 to 30 minutes. The contact time can also be controlled by measuring pH or the oxidation-reduction potential of the water for treatment. pH is increased because the acid is consumed by dissolution of iron. Therefore, the suitable time for the contact can be found as the time until pH becomes 5 to 7. The oxidation-reduction potential is decreased when oxidative substances are reduced. Therefore, the suitable time for the contact can be found as the time until the oxidation-reduction time reaches −100 mV or lower.

In the process of the present invention, the iron is dissolved into the water as ferrous ion when the iron is brought into contact with the water to be treated which has been adjusted to pH of 5 or less. The ferrous ion reacts with oxidative substances in the water, such as peroxosulfuric acid and iodic acid. In the process of the present invention, peroxosulfuric acid is considered to be decomposed in accordance with the following equations:

$$Fe \rightarrow Fe^{2+} + 2e$$

$$S_2O_8^{2-} + 2Fe^{2+} \rightarrow 2SO_4^{2-} + 2Fe^{3+}$$

Iodic acid is considered to be decomposed in accordance with the following equation:

$$2IO_3^- + 10Fe^{2+} + 12H^+ \rightarrow I_2 + 10Fe^{3+} + 6H_2O$$

Selenium compounds are considered to be reduced in accordance with the following equation:

$$SeO_4^{2-} + 6Fe^{2+} + 8H^+ \rightarrow Se^0 + 6Fe^{3+} + 4H_2O$$

In the process of the present invention, the treatment of the waste water for flocculation is conducted after the oxidative substances in the water have been reduced. The method of the flocculation is not particularly limited. It is preferred that, by adding an alkali, ferrous ion and ferric ion in the water are converted into ferrous hydroxide and ferric hydroxide, respectively, which are insoluble in water, and iron flocks are formed to achieve the flocculation. It is preferred that pH of the water for treatment is adjusted to 8 or more, more preferably 9 to 10, by adding an alkali. When pH of the water for treatment is less than 8, there is the possibility that the flocculation, such as the formation of iron flocks, is insufficient. When pH of the water for treatment is adjusted to 8 or more, ferrous ion and ferric ion in the water are converted into ferrous hydroxide and ferric hydroxide, respectively, which are insoluble in water in accordance with the following equations:

$$Fe^{2+} + 2NaOH \rightarrow Fe(OH)_2 + 2Na^+$$

$$Fe^{3+} + 3NaOH \rightarrow Fe(OH)_3 + 3Na^+$$

At this time, the reduced selenium is adsorbed into the iron flocs formed above and separated as a part of the flocs. A part of fluorides is also adsorbed into the iron flocs and separated as a part of the flocs.

In the present invention, other metal ions which give hydroxides insoluble in water are also converted into hydroxides and form flocs of hydroxides when pH of the water for treatment is adjusted to 8 or more. At this time, suspended substances, reduced selenium compounds, and components containing fluorides which are contained in the waste water of flue gas desulfurization are adsorbed and contained in the flocs of iron. When ultra-fine particles of iron are suspended in the water for treatment, the ultra-fine particles of iron are also adsorbed and contained in the flocs of iron. When the reaction system is open to the atmospheric air, the divalent iron is oxidized by the air, and a part of the divalent iron is converted into fine particles of ferric oxide which are also adsorbed and contained in the flocs of iron.

In the process of the present invention, the alkali used for adjusting pH of the water for treatment to 8 or more is not particularly limited, and for example, sodium hydroxide, slaked lime, potassium hydroxide, sodium carbonate, potassium carbonate, or carbide residue can be used. Sodium hydroxide and slaked lime are preferably used.

In the process of the present invention, a macromolecular flocculant can additionally be used in the treatment of waste water for flocculation by addition of an alkali. By the addition of the macromolecular flocculant, the size of the floc is increased, and separation of the flocs from water can be facilitated. The macromolecular flocculant is not particularly limited. Examples of the macromolecular flocculant include nonionic macromolecular flocculants, such as polyacrylamide, polyethylene oxide, and urea-formalin resin; cationic macromolecular flocculants, such as polyaminoalkyl methacrylates, polyethyleneimine, halogenated polydiallyl ammonium, and chitosan; and anionic macromolecular flocculants, such as sodium polyacrylate, partial hydrolysis products of polyacrylamide, partially sulfomethylated polyacrylamide, and poly(2-acrylamido)-2-methylpropane sulfate. Among these macromolecular flocculants, anionic macromolecular flocculants have excellent effects for the flocculation and can preferably be used.

In the present invention, the flocs formed by the treatment for flocculation are removed by solid-liquid separation after the treatment for the flocculation, and water is recovered. The method of solid-liquid separation is not particularly limited, and any desired method of solid-liquid separation, such as precipitation, filtration, centrifugal separation, and separation using a membrane, can be used. Among these methods of solid-liquid separation, the method using a membrane is preferable because fine SS can be removed, and the apparatus can be made smaller.

Figure 1:
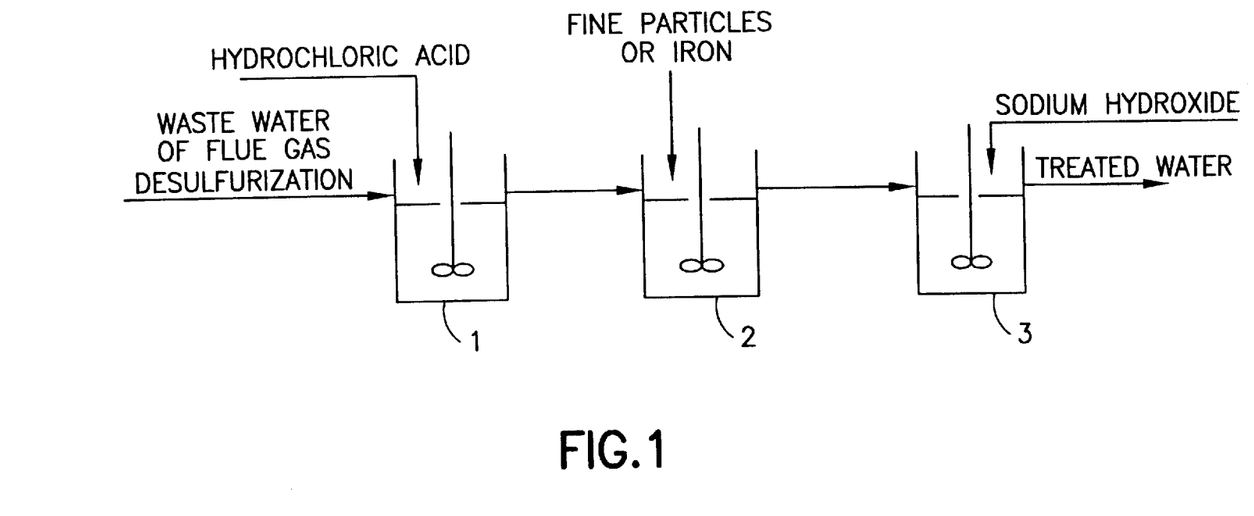
FIG. 1 shows a schematic diagram exhibiting an embodiment of the process of the present invention.

FIG. 1 shows a schematic diagram exhibiting an embodiment of the process of the present invention. In a tank for pH adjustment 1, hydrochloric acid is injected into waste water of flue gas desulfurization, and pH of the waste water is adjusted to 5 or less. The water for treatment which has been adjusted to pH of 5 or less is then transferred to a reactor 2. In the reactor, fine particles of iron is added to the water for treatment to dissolve iron as ferrous ion, and oxidative substances and selenium compounds in the water are reduced. The water to be treated is then transferred to a tank for separation of precipitates 3. pH of the water in the tank is adjusted to 8 or more by injecting sodium hydroxide into the tank to effectuate flocculation of ferrous ion into flocs of ferrous hydroxide, and the resultant water is treated by solid-liquid separation. The treated water is further transferred to additional steps, such as a treatment for removing nitrogen compounds or a high level treatment for removing fluorides, where necessary.

Figure 2:
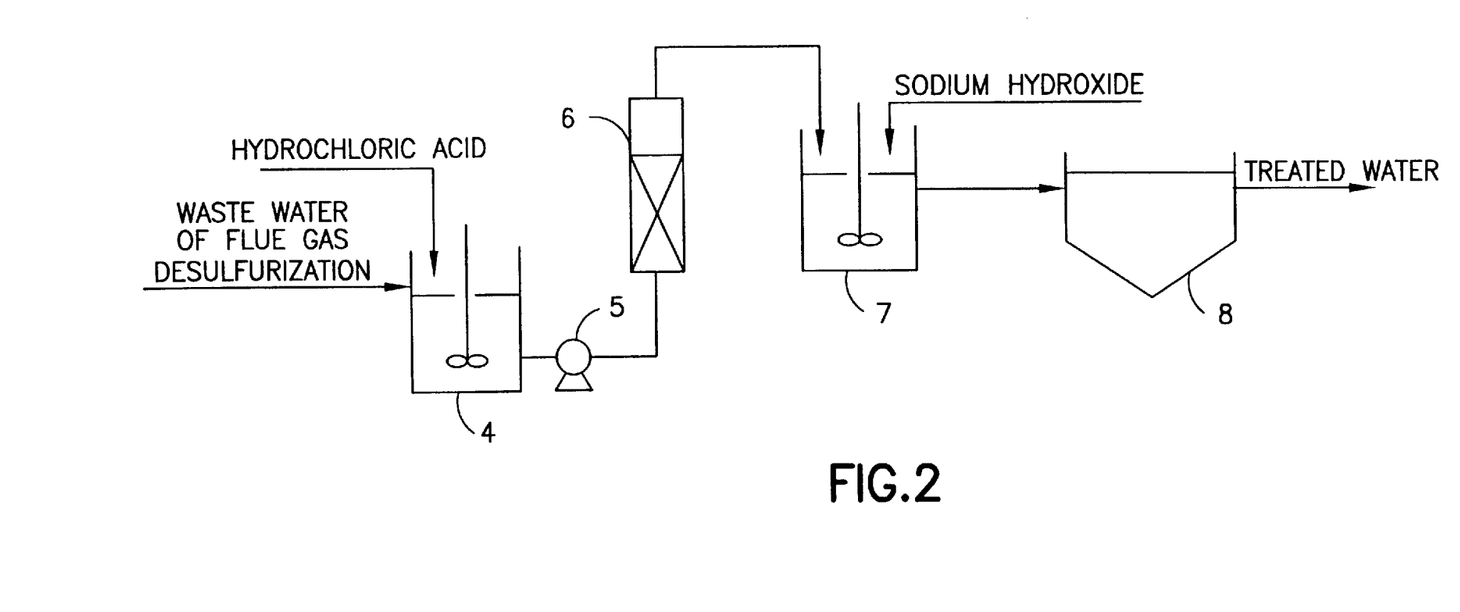
FIG. 2 shows a schematic diagram exhibiting another embodiment of the process of the present invention.

FIG. 2 shows a schematic diagram exhibiting another embodiment of the process of the present invention. In a tank for pH adjustment 4, hydrochloric acid is injected into waste water of flue gas desulfurization, and pH of the waste water is adjusted to 5 or less. The water which has been adjusted to pH of 5 or less is transferred to a column packed with fine particles of iron 6 by a pump 5. In the column, iron is dissolved as ferrous ion, and oxidative substances and selenium compounds in the water are reduced. The resultant water is transferred to a reactor 7. pH of the water in the tank is adjusted to 8 or more by injecting sodium hydroxide into the tank to effectuate flocculation of ferrous ion into flocs of ferrous hydroxide. The obtained water is transferred to a tank for separation of precipitates 8 and the treated water is recovered by solid-liquid separation. The treated water is further transferred to additional steps, such as a treatment for removing nitrogen compounds or a high level treatment for removing fluorides, where necessary.

Because various hazardous substances are contained in waste water of flue gas desulfurization, a desired process can be selected and used in accordance with the contained substances and the object of the treatment. For example, waste water of flue gas desulfurization which has been treated by the adjustment of pH, the reaction with dissolution of iron, the treatment for flocculation, and the treatment for solid-liquid separation is further treated by the adsorption of COD components, the removal of fluorides, and the denitrification to obtain treated water containing no hazardous substances. Alternatively, waste water of flue gas desulfurization which has been treated by the treatment for the flocculation and the treatment for solid-liquid separation, and then by the adsorption with active charcoal, the adsorption of COD components, the removal of fluorides, and the denitrification is further treated mainly to remove selenium compounds in accordance with the process of the present invention by the adjustment of pH, the reaction with dissolution of iron, the treatment for flocculation, and the solid-liquid separation to obtain water containing no hazardous substances. Depending on the quality of waste water of flue gas desulfurization and the quality required for the obtained treated water, one or both of the steps of the adsorption of COD components and the denitrification may be omitted. Among the above processes, the process in which waste water of flue gas desulfurization is treated by the adjustment of pH at first, and then by the reaction with dissolution of iron, the treatment for flocculation, and the solid-liquid separation is preferable because of the simplicity.

In the process of the present invention, after waste water of flue gas desulfurization is treated by the dissolution of iron, the treatment for flocculation, and the solid-liquid separation, the treated water is brought into contact with a resin for COD adsorption. The method of bringing the treated water with the resin for COD adsorption is not particularly limited. The treated water can be brought into contact with the resin for COD adsorption by passing the treated water through a column packed with a resin for COD adsorption. Because COD components contained in waste water of flue gas desulfurization are mainly dithionic acids, an anion exchange resin can advantageously be used for this purpose. Unlike COD components generally contained in waste water, dithionic acids cannot be removed by conventional methods for removing COD components, such as adsorption with active charcoal, oxidative decomposition, and biological decomposition. However, dithionic acid can be removed with an anion exchange resin by adsorption. The used anion exchange resin is not particularly limited, and any of weakly basic, medium basic, and strongly basic anion exchange resins can be used. Weakly basic or medium basic anion exchange resins are preferable to strongly basic anion exchange resins because of larger capacity for adsorption of COD components. Anion exchange resins of a salt form, such as the Cl form or the $SO_4$ form, are preferably used because of larger capacity of the adsorption although anion exchange resins of the OH form can also be used.

By passing water for treatment through a column of COD adsorption which is packed with the above anionic ion exchange resin, COD components in the water for treatment can be removed by adsorption. The water for treatment is preferably passed at a speed of an SV of about 5 to 20 $hr^{-1}$. It is also preferred that pH of the water for treatment is kept at the acidic side. When the waste water of flue gas of desulfurization is treated by a process comprising bringing the waste water into contact with a resin for adsorption of COD components as the final step of the process, heavy metals, selenium, and fluorine compounds as well as peroxides such as peroxosulfuric acid and iodic acid in the water for treatment are removed before the water is treated by the step using the resin for COD adsorption. Therefore, the deterioration of the resin for COD adsorption can be prevented, and COD in the treated water can be decreased for a long time.

Figure 3:
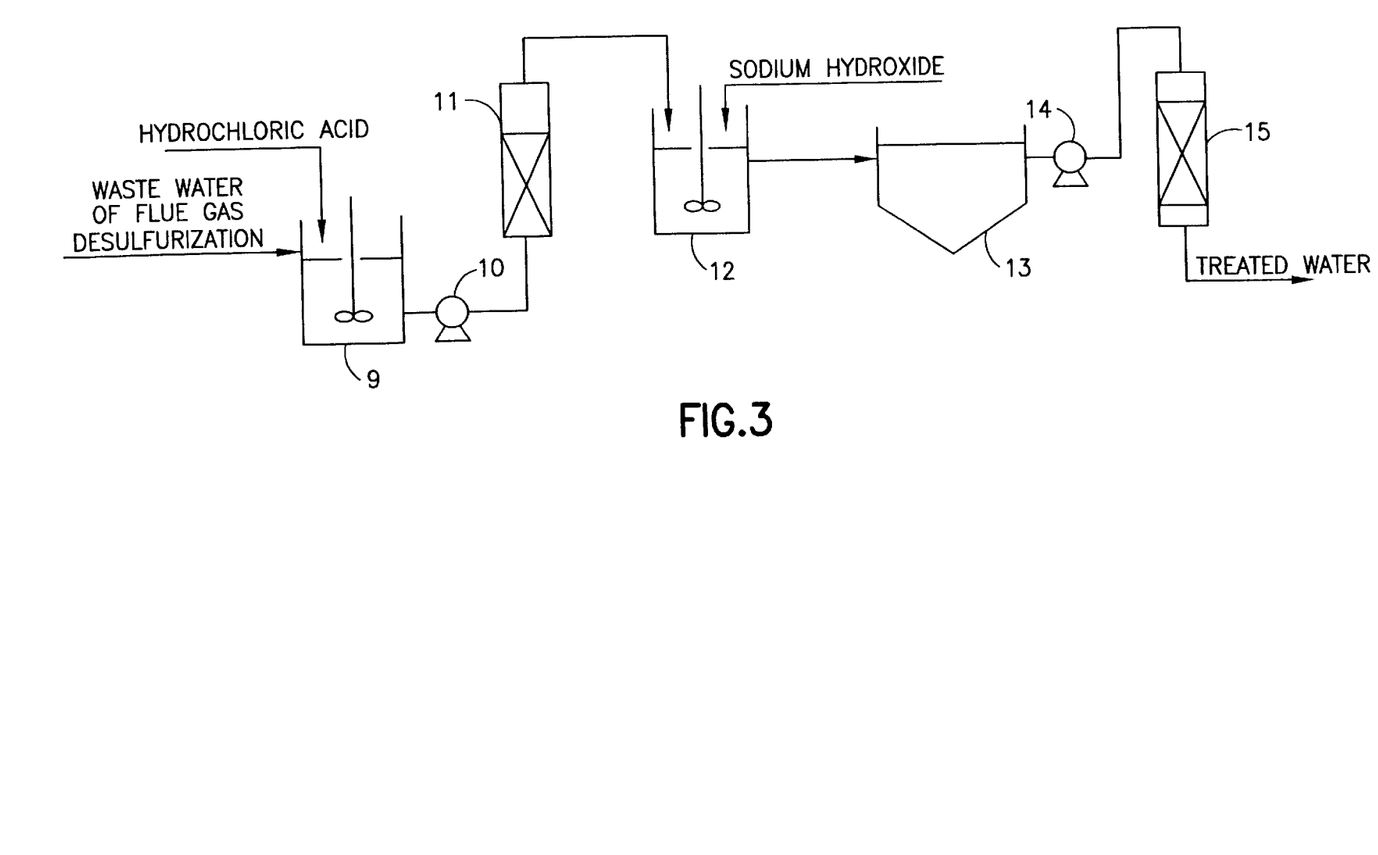
FIG. 3 shows a schematic diagram exhibiting still another embodiment of the process of the present invention.

FIG. 3 shows a schematic diagram exhibiting still another embodiment of the process of the present invention. In a tank for pH adjustment 9, hydrochloric acid is injected into waste water of flue gas desulfurization to adjust pH of the water to 5 or less. After the adjustment of pH, the waste water is transferred to a column 11 packed with fine particles of iron by a pump 10. There, iron is dissolved as ferrous ion, and oxidative substances and selenium compounds in the water for treatment are reduced. The water to be treated is then transferred to a reactor 12. Into the reactor, sodium hydroxide is injected to adjust pH of the water to 8 or more, and ferrous ion is converted into flocs of ferrous hydroxide. The water to be treated containing the flocs of iron formed in the reactor is then transferred to a tank for separation of precipitates 13, and the supernatant water is separated by a method of solid-liquid separation. pH of the supernatant water is adjusted to the neutral or lower (for example, a pH of 5 to 7) by using hydrochloric acid or sulfuric acid. The obtained water is transferred to a column packed with a resin for COD adsorption 15 by a pump 14 and brought into contact with the resin for COD adsorption.

By using the process of the present invention, hazardous substances can be removed in the first step of a system for treatment of waste water of flue gas desulfurization, and simplification of the system for treatment of the waste water is enabled. In accordance with the process for treating waste water of flue gas desulfurization of the present invention, it is made possible that selenium in the treated water is decreased with stability to the concentration of 0.1 mg/liter or less which is required by the regulation for waste water, and COD in the treated waste water can be decreased for a long time with stability without causing deterioration of the resin for COD adsorption.

The present invention is described in more detail with reference to examples in the following. However, the present invention is not limited by the examples.

EXAMPLE 1

Waste water of flue gas desulfurization having pH of 6.7 and containing 17.2 mg/liter of peroxosulfate ion, 1.6 mg/liter of iodate ion, 0.5 mg/liter of copper, 0.2 mg/liter of lead, 0.5 mg/liter of zinc, 0.6 mg/liter of selenium, and 30 mg/liter of fluoride ion was treated by the apparatus shown in FIG. 1.

Into 1 liter of the waste water of flue gas desulfurization, hydrochloric acid was injected in such an amount that the concentration of hydrochloric acid was 180 mg/liter, and pH of the waste water was adjusted to 3. To the resultant water, 50 g of fine particles of iron of 100 mesh were added, and the obtained mixture was stirred under 300 rpm for 30 minutes. The dissolved amount of iron was 200 mg/liter. Then, sodium hydroxide was injected into the resultant water in such an amount that the concentration of sodium hydroxide was 300 mg/liter, and pH of the water was adjusted to 9. The obtained water was stirred under 300 rpm for 30 minutes for the treatment for flocculation. The supernatant water was neutralized with hydrochloric acid so that the treated water can be discharged outside.

The quality of the supernatant water was as follows: pH, 7.5; peroxosulfate ion, 0.1 mg/liter or less; iodate ion, 0.1 mg/liter or less; copper, 0.1 mg/liter or less; lead, 0.1 mg/liter or less; zinc, 0.1 mg/liter or less; selenium, 0.1 mg/liter or less, and fluoride ion, 17 mg/liter.

COMPARATIVE EXAMPLE 1

Into the same waste water of flue gas desulfurization as that used in Example 1, ferrous sulfate was injected in such an amount that the concentration of ferrous sulfate was 2,000 mg/liter. Then, hydrochloric acid was injected into the obtained water in such an amount that the concentration of hydrochloric acid was 1,000 mg/liter, and pH of the water was adjusted to 3. After the obtained water was stirred under 300 rpm for 30 minutes, sodium hydroxide was injected into the water in such an amount that the concentration of sodium hydroxide was 1,800 mg/liter, and pH of the water was adjusted to 9.1. The resultant water was stirred under 300 rpm for 30 minutes for the treatment for flocculation.

The quality of the supernatant water after neutralization was as follows: pH, 7.5; peroxosulfate ion, 0.1 mg/liter or less; iodate ion, 0.1 mg/liter or less; copper, 0.1 mg/liter or less; lead, 0.1 mg/liter or less; zinc, 0.1 mg/liter or less; selenium, 0.5 mg/liter, and fluoride ion, 15 mg/liter.

COMPARATIVE EXAMPLE 2

Into the same waste water of flue gas desulfurization as that used in Example 1, slaked lime and a macromolecular flocculant of polyacrylamide were injected in such amounts that the concentration of slaked lime was 1,500 mg/liter and the concentration of the macromolecular flocculant was 1 mg/liter. The resultant water was stirred under 300 rpm for 30 minutes for the treatment for flocculation.

After the supernatant water was filtered, hydrochloric acid was injected into the obtained water in such an amount that the concentration of hydrochloric acid was 75 mg/liter, and pH of the water was adjusted to 3. Then, the resultant water was transferred to a column packed with active charcoal and was passed through the column at a speed of $SV=10\ hr^{-1}$.

The quality of the supernatant water after neutralization was as follows: pH, 7.0; peroxosulfate ion, 0.3 mg/liter; iodate ion, 0.1 mg/liter; copper, 0.1 mg/liter or less; lead, 0.1 mg/liter or less; zinc, 0.1 mg/liter or less; selenium, 0.6 mg/liter, and fluoride ion, 15 mg/liter.

The results obtained in Example 1 and Comparative Examples 1 and 2 are shown together in Table 1.

TABLE 1

| | waste water of flue gas desulfurization | Example 1 | Comparative Example 1 | Comparative Example 2 |
|---|---|---|---|---|
| pH | 6.7 | 7.5 | 7.5 | 7.0 |
| $S_2O_8^{2-}$ | 17.2 | <0.1 | <0.1 | 0.3 |

TABLE 1-continued

| | waste water of flue gas desulfurization | Example 1 | Comparative Example 1 | Comparative Example 2 |
|---|---|---|---|---|
| $IO_3^-$ | 1.6 | <0.1 | <0.1 | 0.1 |
| Cu | 0.5 | <0.1 | <0.1 | <0.1 |
| Pb | 0.2 | <0.1 | <0.1 | <0.1 |
| Zn | 0.5 | <0.1 | <0.1 | <0.1 |
| Se | 0.6 | <0.1 | 0.5 | 0.6 |
| F | 30 | 17 | 15 | 15 |

(The concentrations are shown in terms of mg/liter.)

As shown by the results in Table 1, in Example 1, selenium in the treated waste water was removed to the concentration of 0.1 mg/liter or less which satisfies the regulation for waste water. In contrast, selenium was hardly removed in the treated waste water in Comparative Examples 1 and 2. As for the amounts of materials used for the treatment, the amounts of hydrochloric acid and sodium hydroxide used in Comparative Example 1 were more than 5 times as much as those used in Example 1. The dissolved amount of iron in Example 1 was 200 mg/liter. In contrast, the amount of ferrous sulfate used in Comparative Example 1 was 2,000 mg/liter, and this means that 735 mg/liter of iron was necessary. In Comparative Example 2, a column packed with active charcoal was necessary, and cost for the apparatus and maintenance of the apparatus was increased.

EXAMPLE 2

The same waste water of flue gas desulfurization as that used in Example 1 was treated by using the apparatus shown in FIG. 2.

Into a tank for pH adjustment containing the waste water, hydrochloric acid was injected in such an amount that the concentration of hydrochloric acid was 370 mg/liter, and pH of the waste water was adjusted to 2.5. Then, the water was passed through a column packed with fine particles of iron of 100 mesh in the upward flow by a pump at a speed of $SV=20\ hr^{-1}$. The water coming out of the column was introduced to a reactor. Into the reactor, sodium hydroxide was injected in such an amount that the concentration of sodium hydroxide was 400 mg/liter to adjust pH of the water to 9, and the reaction for the flocculation was conducted. The obtained water was transferred to a tank for separation of precipitates, and the solid-liquid separation was conducted.

The quality of the treated water after neutralization was as follows: pH, 7.0; peroxosulfate ion, 0.3 mg/liter; iodate ion, 0.1 mg/liter or less; copper, 0.1 mg/liter or less; lead, 0.1 mg/liter or less; zinc, 0.1 mg/liter or less; selenium, 0.1 mg/liter or less, and fluoride ion, 10 mg/liter.

EXAMPLE 3

The same procedures as those conducted in Example 2 were conducted except that the column was packed with fine particles of iron of 60 mesh in place of fine particles of iron of 100 mesh.

The quality of the treated water after neutralization was as follows: pH, 7.5; peroxosulfate ion, 0.3 mg/liter; iodate ion, 0.1 mg/liter; copper, 0.1 mg/liter or less; lead, 0.1 mg/liter or less; zinc, 0.1 mg/liter or less; selenium, 0.1 mg/liter or less, and fluoride ion, 10 mg/liter.

The results obtained in Examples 2 and 3 are shown in Table 2.

TABLE 2

|  | waste water of flue gas desulfurization | Example 2 | Example 3 |
|---|---|---|---|
| pH | 6.7 | 7.0 | 7.5 |
| $S_2O_8^{2-}$ | 17.2 | 0.3 | 0.3 |
| $IO_3^-$ | 1.6 | <0.1 | 0.1 |
| Cu | 0.5 | <0.1 | <0.1 |
| Pb | 0.2 | <0.1 | <0.1 |
| Zn | 0.5 | <0.1 | <0.1 |
| Se | 0.6 | <0.1 | <0.1 |
| F | 30 | 10 | 19 |

(The concentrations are shown in terms of mg/liter.)

In both of Examples 2 and 3, the hazardous substances were sufficiently removed. Particularly, selenium which is hardly removed in conventional processes was removed to the concentration of 0.1 mg/liter or less which satisfies the regulation for waste water.

EXAMPLE 4

The same waste water of flue gas desulfurization as that used in Example 1 was treated by the treatments of flocculation, precipitation, filtration, COD adsorption, and biological denitrification, successively, to obtain denitrified water. The quality of the obtained water was as follows: pH, 7.8; peroxosulfate ion, 0.1 mg/liter or less; iodate ion, 0.2 mg/liter; copper, 0.1 mg/liter or less; lead, 0.1 mg/liter or less; zinc, 0.1 mg/liter or less; selenium, 0.4 mg/liter, and fluoride ion, 10 mg/liter.

Into 1 liter of the denitrified water obtained above, hydrochloric acid was injected in such an amount that the concentration of hydrochloric acid was 180 mg/liter, and pH of the water was adjusted to 3. To the resultant water, 50 g of fine particles of iron of 100 mesh were added, and the mixture was stirred under 300 rpm for 30 minutes. The dissolved amount of iron was 200 mg/liter. Then, sodium hydroxide was added to the obtained water in such an amount that the concentration of sodium hydroxide was 300 mg/liter, and pH of the water was adjusted to 9. The obtained water was stirred under 300 rpm for 30 minutes for the treatment for flocculation.

The quality of the treated water after neutralization was as follows: pH, 7.5; peroxosulfate ion, 0.1 mg/liter or less; iodate ion, 0.1 mg/liter or less; copper, 0.1 mg/liter or less; lead, 0.1 mg/liter or less; zinc, 0.1 mg/liter or less; selenium, 0.1 mg/liter or less, and fluoride ion, 8 mg/liter.

COMPARATIVE EXAMPLE 3

Into the denitrified waste water obtained in Example 4, ferrous sulfate was injected in such an amount that the concentration of ferrous sulfate was 2,000 mg/liter. Then, hydrochloric acid was injected into the resultant water in such an amount that the concentration of hydrochloric acid was 1,000 mg/liter, and pH of the water was adjusted to 3. After the obtained water was stirred under 300 rpm for 30 minutes, sodium hydroxide was injected into the water in such an amount that the concentration of sodium hydroxide was 1,800 mg/liter, and pH of the water was adjusted to 9. The resultant water was stirred under 300 rpm for 30 minutes for the treatment for flocculation.

The quality of the supernatant water after neutralization was as follows: pH, 7.5; peroxosulfate ion, 0.1 mg/liter or less; iodate ion, 0.1 mg/liter or less; copper, 0.1 mg/liter or less; lead, 0.1 mg/liter or less; zinc, 0.1 mg/liter or less; selenium, 0.15 mg/liter, and fluoride ion, 8 mg/liter.

The results obtained in Example 4 and Comparative Example 3 are shown together in Table 3.

TABLE 3

|  | denitrified water | Example 4 | Comparative Example 3 |
|---|---|---|---|
| pH | 7.8 | 7.5 | 7.5 |
| $S_2O_8^{2-}$ | <0.1 | <0.1 | <0.1 |
| $IO_3^-$ | 0.2 | <0.1 | <0.1 |
| Cu | <0.1 | <0.1 | <0.1 |
| Pb | <0.1 | <0.1 | <0.1 |
| Zn | <0.1 | <0.1 | <0.1 |
| Se | 0.4 | <0.1 | 0.15 |
| F | 10 | 8 | 8 |

(The concentrations are shown in terms of mg/liter.)

As shown by the results in Table 3, it can be understood that selenium could be removed to the concentration of 0.1 mg/liter or less which satisfies the regulation for waste water when most of hazardous substances in the waste water of flue gas desulfurization were removed by the treatments conducted in advance, and the obtained denitrified water containing selenium compounds as the major remaining hazardous substance was brought into contact with fine particles of iron in accordance with the process of the present invention. In contrast, the concentration of selenium could not be decreased sufficiently by the addition of ferrous sulfate although both iron sources were used for the same purpose.

EXAMPLE 5

Waste water of flue gas desulfurization having pH of 6.5 and containing 17.2 mg/liter of peroxosulfate ion, 1.6 mg/liter of iodate ion, 0.5 mg/liter of copper, 0.2 mg/liter of lead, 0.5 mg/liter of zinc, 0.6 mg/liter of selenium, and 20 mg/liter of COD was treated by the apparatus shown in FIG. 3.

Into 1 liter of the waste water of flue gas desulfurization, hydrochloric acid was injected in such an amount that the concentration of hydrochloric acid was 300 mg/liter, and pH of the waste water was adjusted to 3. The resultant water was passed through a column packed with fine particles of iron of 100 mesh in an upward flow at a speed of $SV=20 \text{ hr}^{-1}$, and the water coming out of the column was introduced into a tank for a reactor for flocculation. In the reactor, sodium hydroxide was injected into the water, and pH of the water was adjusted to 9 for the reaction for flocculation. The obtained product was transferred to a tank for separation of precipitates, and treated by the solid-liquid separation. The quality of the supernatant water obtained after the solid-liquid separation was as follows: pH, 9.0; peroxosulfate ion, 0.1 mg/liter or less; iodate ion, 0.1 mg/liter; copper, 0.1 mg/liter or less; lead, 0.1 mg/liter or less; zinc, 0.1 mg/liter or less; selenium, 0.1 mg/liter or less, and COD, 18 mg/liter.

Then, pH of the water obtained after the solid-liquid separation was adjusted to 6, and the water was passed through a column for COD adsorption packed with 200 ml of a weakly basic anion exchange resin of the Cl form (DIAION WA-30, a product of MITSBISHI KAGAKU Co., Ltd., a registered trade name) at a speed of $SV=10 \text{ hr}^{-1}$. The quality of the treated water at the time when the amount of the treated water reached BV200 was as follows: pH, 6.0; peroxosulfate ion, 0.1 mg/liter or less; iodate ion, 0.1 mg/liter or less; copper, 0.1 mg/liter or less; lead, 0.1 mg/liter or less; zinc, 0.1 mg/liter or less; selenium, 0.1 mg/liter or less, and COD, 5 mg/liter.

COMPARATIVE EXAMPLE 4

Into the same waste water of flue gas desulfurization as that used in Example 5, ferrous sulfate was injected in such an amount that the concentration of ferrous sulfate was 2,000 mg/liter, and pH of the waste water was adjusted to 5. After the obtained water was stirred under 300 rpm for 30 minutes, sodium hydroxide was injected into the water, and pH of the water was adjusted to 9. The resultant water was stirred under 300 rpm for 30 minutes for the treatment for flocculation. Supernatant water obtained after the solid-liquid separation contained 1.0 mg/liter of peroxosulfate ion and 1.5 mg/liter of iodate ion.

The supernatant water obtained after the solid-liquid separation was passed through the same column for COD adsorption as that used in Example 3 under the same condition as that in Example 3. The quality of the treated water at the time when the amount of the treated water reached BV200 was as follows: pH, 6.0; peroxosulfate ion, 0.1 mg/liter or less; iodate ion, 0.5 mg/liter; copper, 0.1 mg/liter or less; lead, 0.1 mg/liter or less; zinc, 0.1 mg/liter or less; selenium, 0.3 mg/liter, and COD, 15 mg/liter.

The results obtained in Example 5 and Comparative Example 4 are shown together in Table 4.

TABLE 4

|  | Example 5 | | | |
| --- | --- | --- | --- | --- |
|  | waste water of flue gas desulfurization | supernatant water | treated water | Comparative Example 4 |
| pH | 6.5 | 9.0 | 6.0 | 6.0 |
| $S_2O_8^{2-}$ | 17.2 | <0.1 | <0.1 | <0.1 |
| $IO_3^-$ | 1.6 | 0.1 | <0.1 | 0.5 |
| Cu | 0.5 | <0.1 | <0.1 | <0.1 |
| Pb | 0.2 | <0.1 | <0.1 | <0.1 |
| Zn | 0.5 | <0.1 | <0.1 | <0.1 |
| Se | 0.6 | <0.1 | <0.1 | 0.3 |
| COD | 20 | 18 | 5 | 15 |

(The concentrations are shown in terms of mg/liter.)

As shown in the results in Table 4, the removal of iodate ion and selenium by the treatment in Comparative Example 4 was insufficient, and selenium could not be removed to the concentration of 0.1 mg/liter or less which is required by the regulation of waste water. It is also shown that the resin for COD adsorption was deteriorated, and COD in the treated water was not decreased sufficiently. In contrast, in Example 5, the concentration of iodate ion in the treated water was low. Selenium was removed to the concentration of 0.1 mg/liter or less which is required by the regulation of waste water, and COD was also decreased to 5 mg/liter.

To summarize the advantages of the present invention, in accordance with the process for treating waste water of flue gas desulfurization of the present invention, oxidative substances, such as peroxosulfuric acid, and metals can be removed simultaneously and efficiently, and thus the system for waste water treatment can be simplified in comparison to conventional systems. The control of the operation for the treatment of waste water can be made simpler and easier in comparison with that in conventional processes in which active charcoal is used for the reduction reaction or an agent such as ferrous sulfate is used as the reducing agent. The amount of iron can be decreased to one quarter as much as the amount of iron which is required for exhibiting the same effect in a process using ferrous sulfate. Moreover, deterioration of the resin for COD adsorption is absent, and COD in treated water can be decreased for a long time with stability.

What is claimed is:

1. A process for treating waste water of flue gas desulfurization said waste water containing selenium compounds, comprising successively adjusting the pH of the waste water to 5 or less, bringing the waste water into contact with a column packed with fine particles of iron, flocculating the waste water, and removing formed flocs from the waste water by solid-liquid separation whereby selenium in the treated water is decreased to a concentration of 0.1 mg/liter or less.

2. A process according to claim 1 wherein the waste water of flue gas desulfurization is from an apparatus for desulfurization of flue gas in a thermoelectric power plant using coal or petroleum as a fuel.

3. A process according to claim 1 wherein the waste water of flue gas desulfurization contains oxidative substances.

4. A process according to claim 3 wherein the oxidative substance is peroxosulfuric acid or iodic acid.

5. A process according to claim 1 wherein the iron particles have a maximum diameter of 3 mm or less.

6. A process according to claim 1 wherein pH of the waste water is adjusted to 2 to 3.

7. A process according to claim 1 wherein pH of the waste water is adjusted to 5 or less by adding an acid in two or more separate steps.

8. A process according to claim 1 wherein the waste water is brought into contact with the column packed with fine particles of iron until the treated waste water reaches a pH of 5 to 7 or until the treated waste water reaches an oxidation-reduction potential of −100 mV or less.

9. A process according to claim 1 wherein the flocculation is conducted by adjusting the pH of the waste water to 8 or more by adding an alkali.

10. A process for treating waste water of flue gas desulfurization, said waste water containing selenium compounds, comprising successively adjusting the pH of the waste water to 5 or less, bringing the waste water into contact with a column packed with fine particles of iron, flocculating the waste water, removing formed flocs from the waste water by solid-liquid separation, and bringing the remaining waste water into contact with a resin for COD adsorption, whereby selenium in the treated water is decreased to a concentration of 0.1 mg/liter or less.

11. A process according to claim 10 wherein the waste water of flue gas desulfurization is from an apparatus for desulfurization of flue gas in a thermoelectric power plant using coal or petroleum as a fuel.

12. A process according to claim 10 wherein the waste water of flue gas desulfurization contains oxidative substances.

13. A process according to claim 12 wherein the oxidative substance is peroxosulfuric acid or iodic acid.

14. A process according to claim 10 wherein the iron particles, net wires, or granules have a maximum diameter of 3 mm or less.

15. A process according to claim 10 wherein pH of the waste water is adjusted to 2 to 3.

16. A process according to claim 10 wherein pH of the waste water is adjusted to 5 or less by adding an acid in two or more separate steps.

17. A process according to claim 10 wherein the waste water is brought into contact with the column packed with fine particles of iron until the treated waste water reaches a pH of 5 to 7 or until the treated waste water reaches an oxidation-reduction potential of −100 mV or less.

18. A process according to claim 10 wherein the resin for COD adsorption is an anion exchange resin.

* * * * *